April 9, 1940.    H. F. GLUNZ    2,196,209
CLOSURE PREPARING AND FEEDING MECHANISM
Filed July 20, 1937    12 Sheets-Sheet 1

INVENTOR.
Henry F. Glunz
BY Darby & Darby
ATTORNEYS

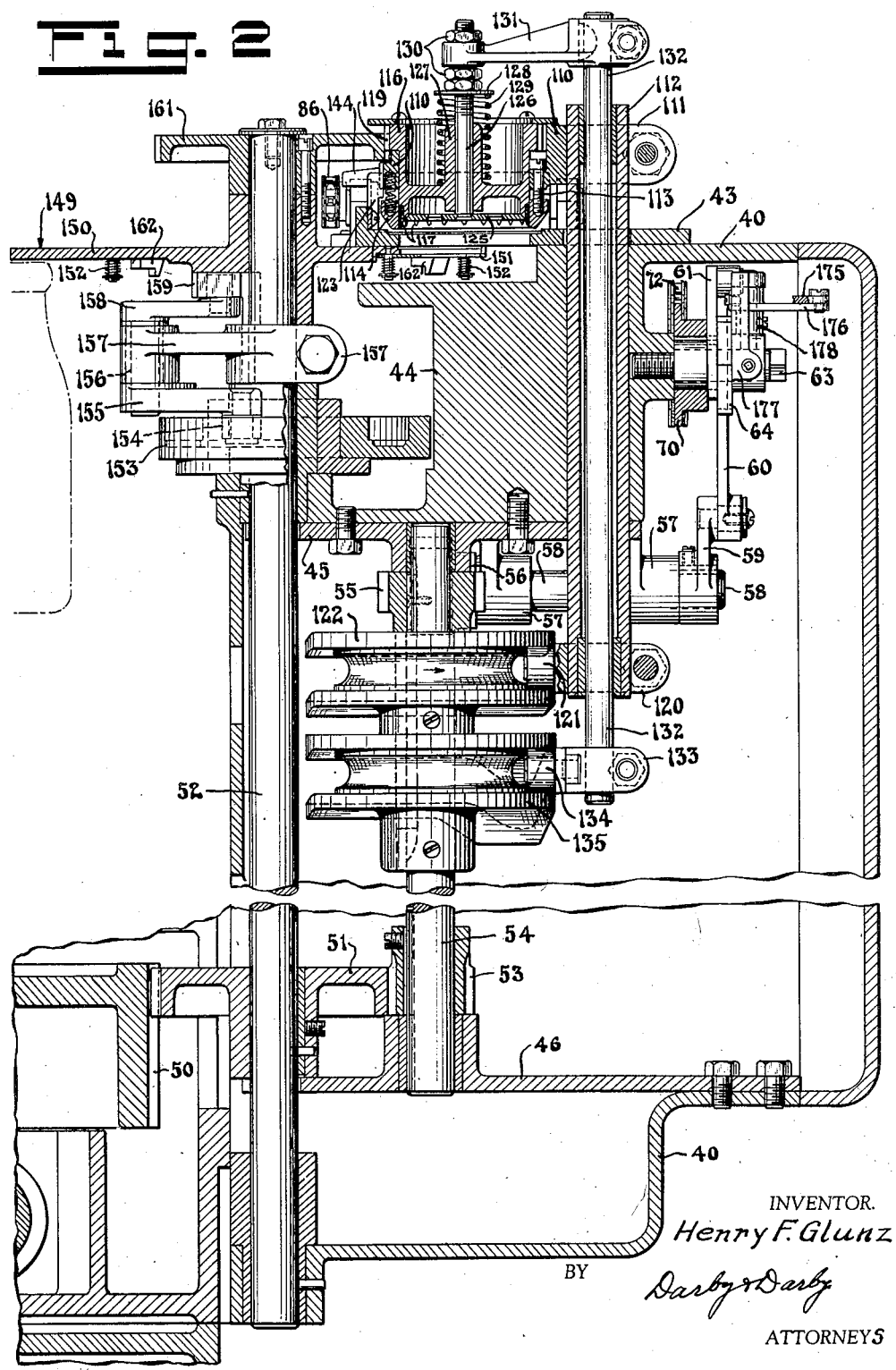

April 9, 1940.  H. F. GLUNZ  2,196,209
CLOSURE PREPARING AND FEEDING MECHANISM
Filed July 20, 1937   12 Sheets-Sheet 3
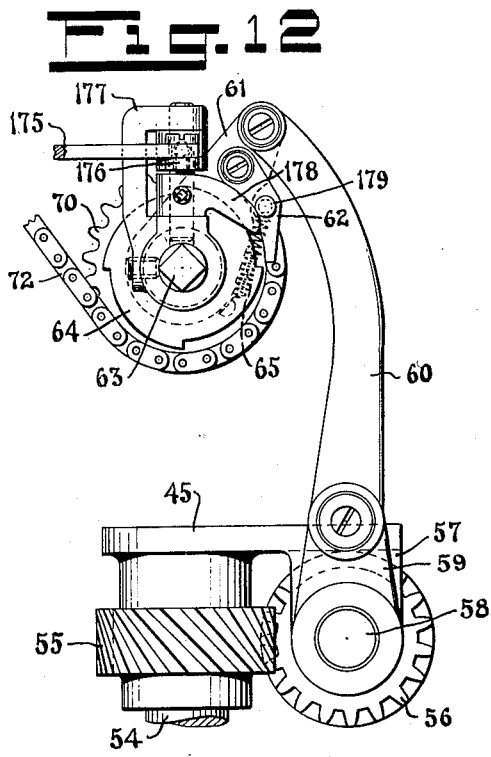
Fig. 12
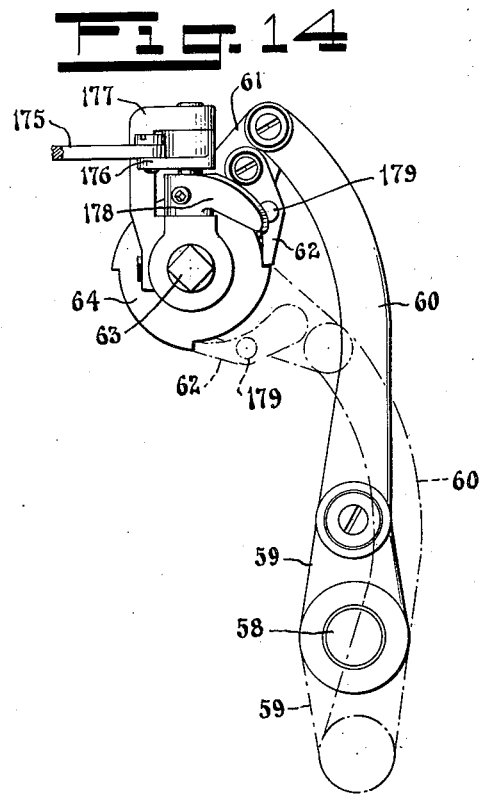
Fig. 14
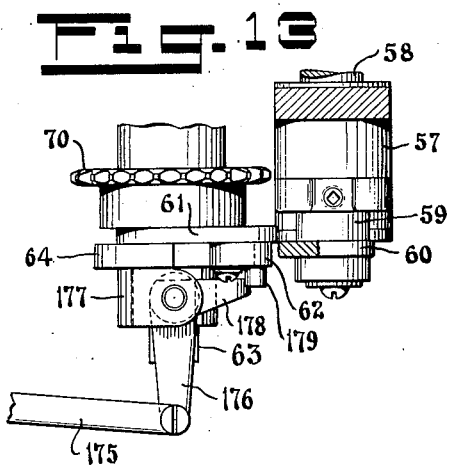
Fig. 13
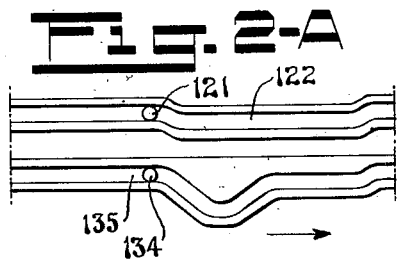
Fig. 2-A
INVENTOR.
Henry F. Glunz
BY Darby & Darby
ATTORNEYS

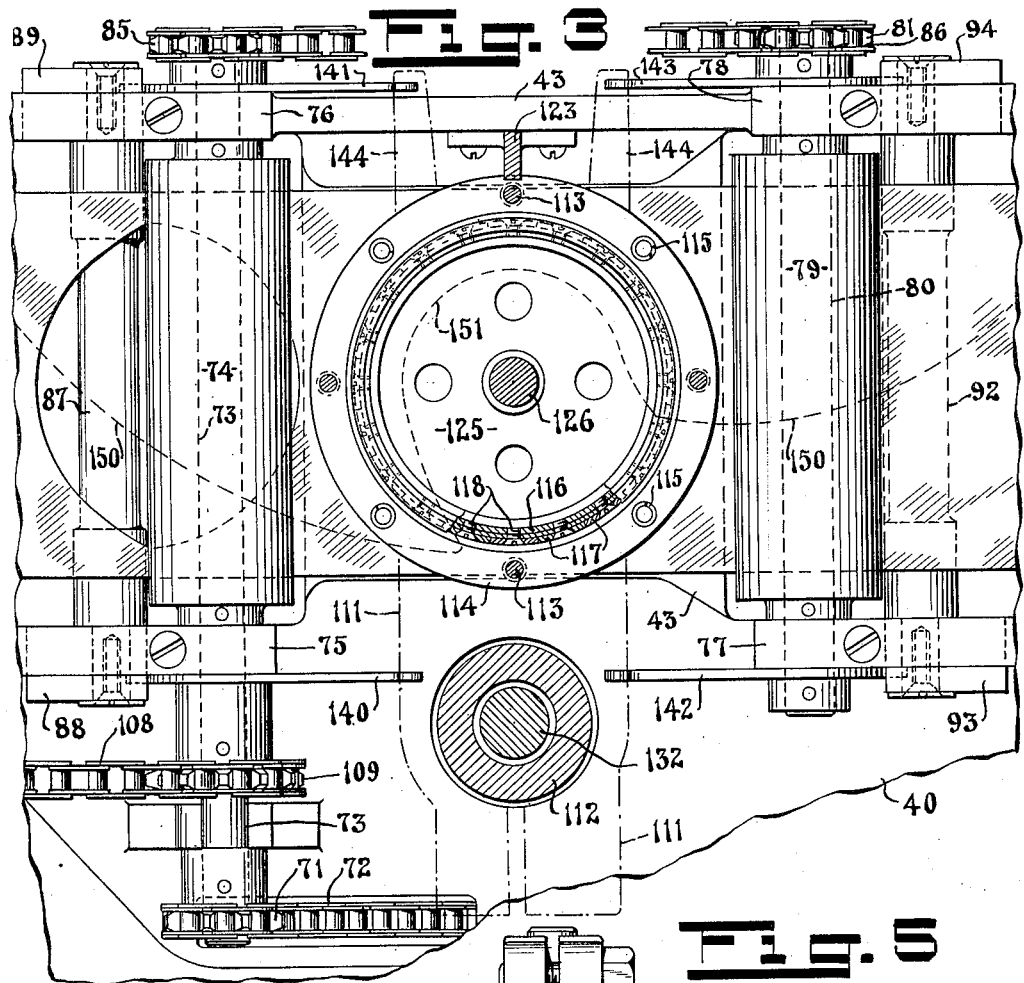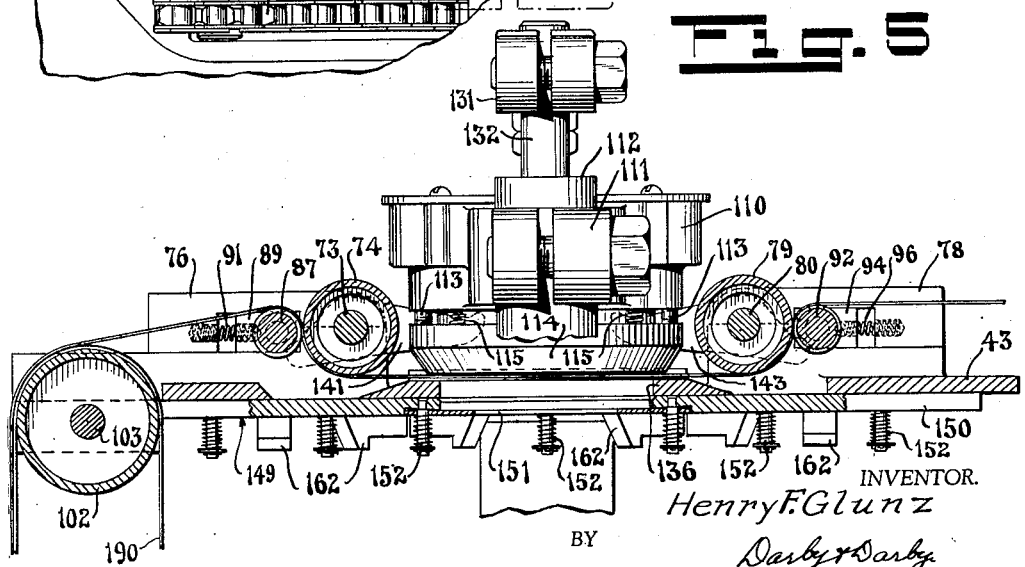

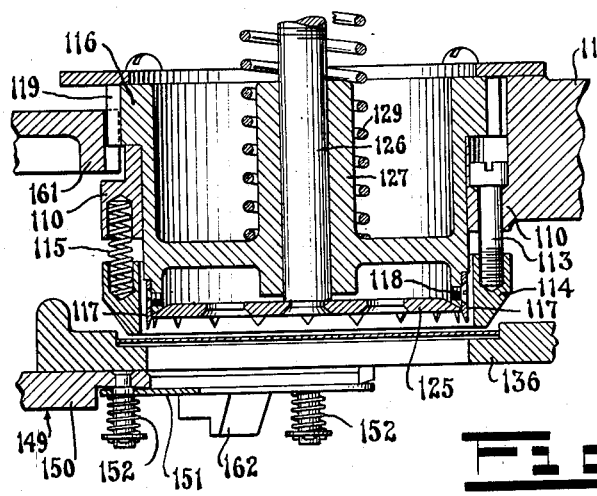
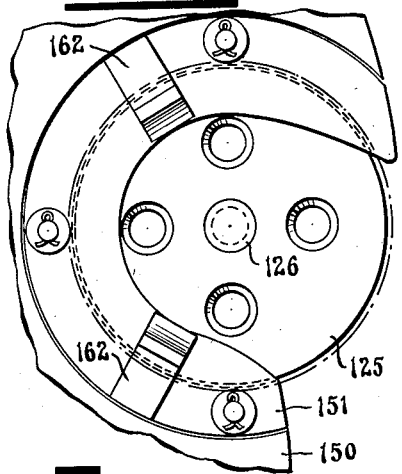
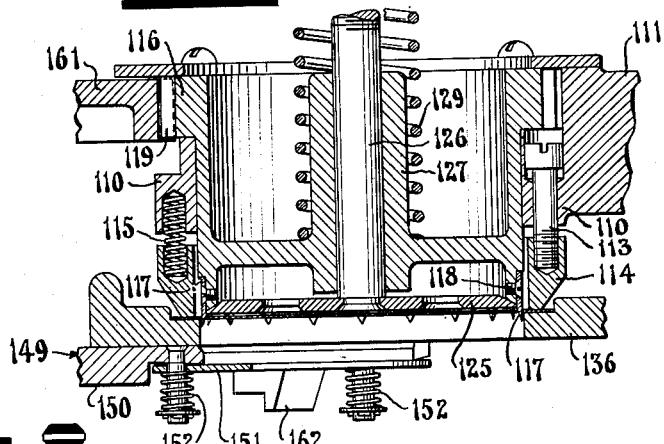
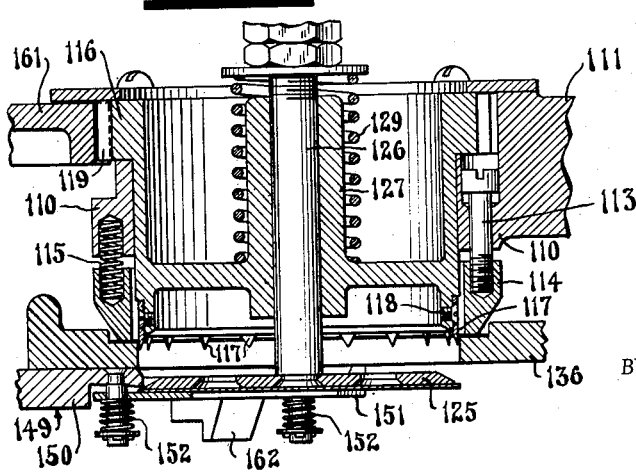

April 9, 1940.  H. F. GLUNZ  2,196,209
CLOSURE PREPARING AND FEEDING MECHANISM
Filed July 20, 1937  12 Sheets-Sheet 6
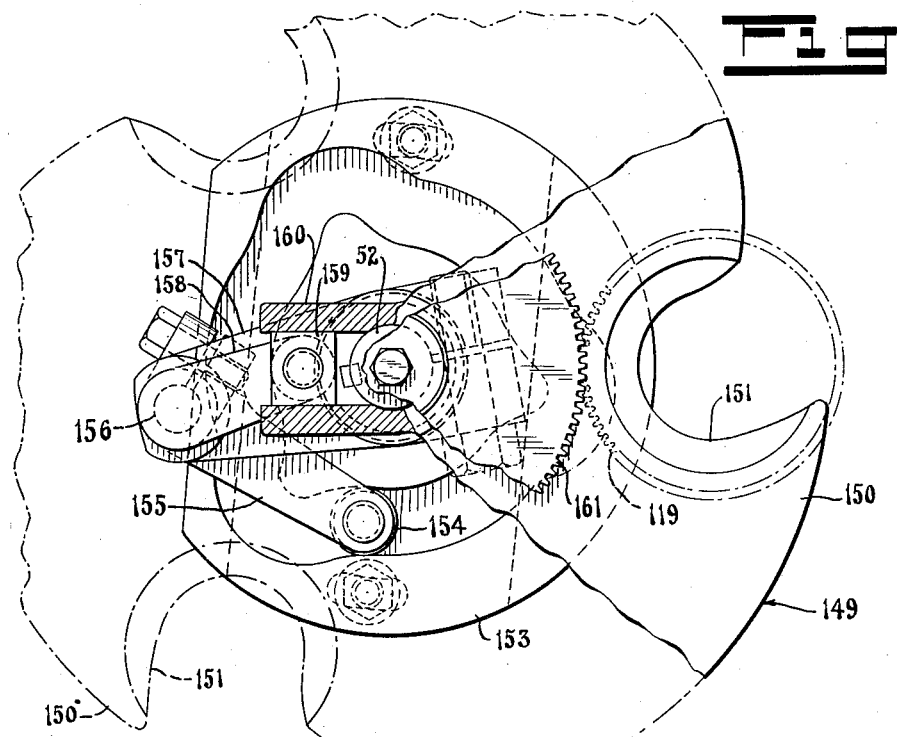
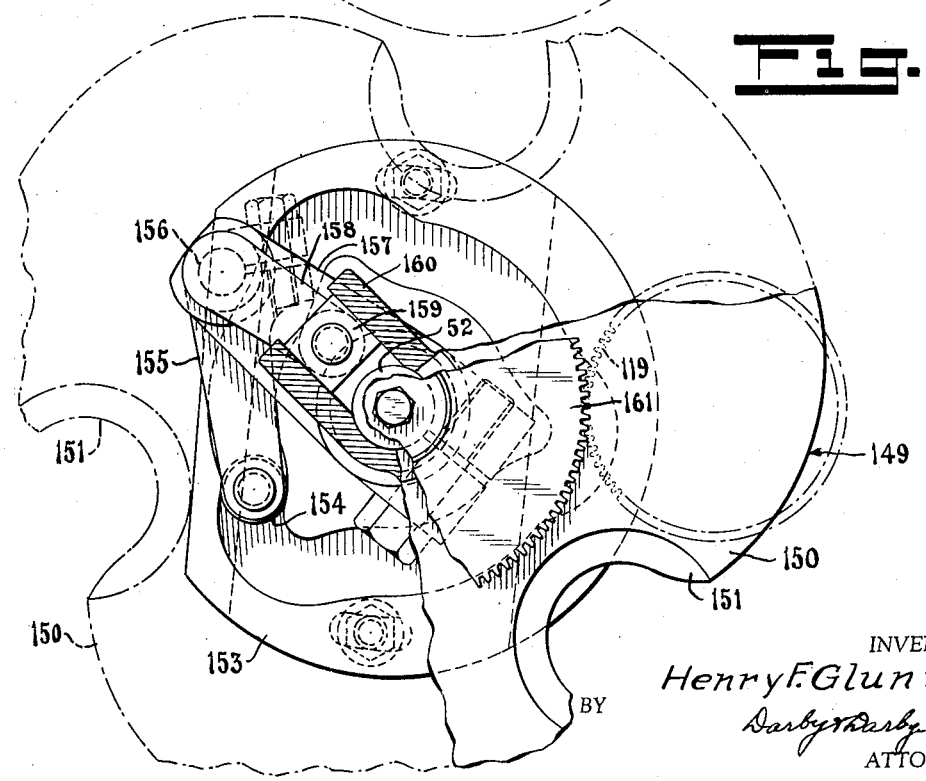
INVENTOR.
Henry F. Glunz
BY Darby & Darby
ATTORNEYS

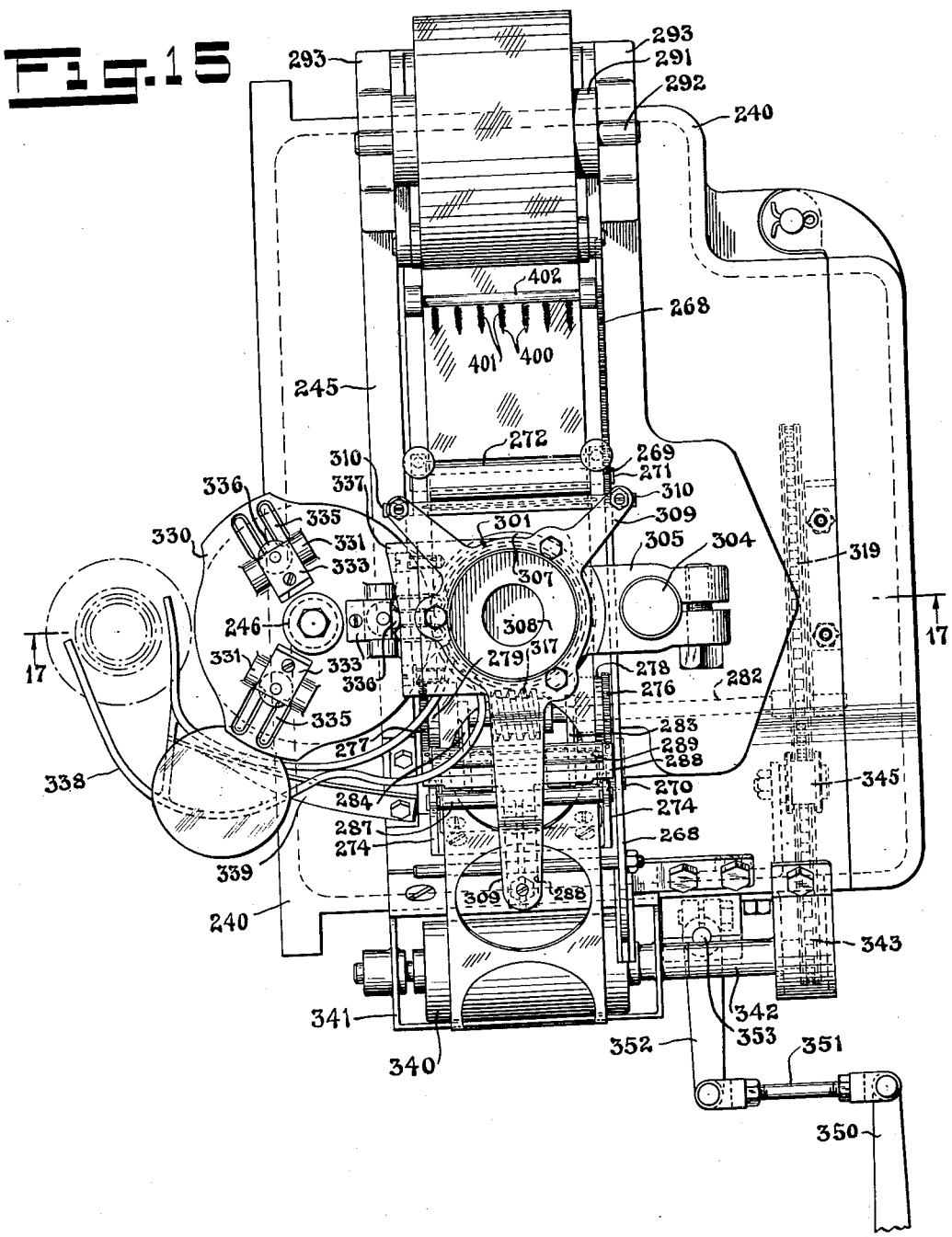

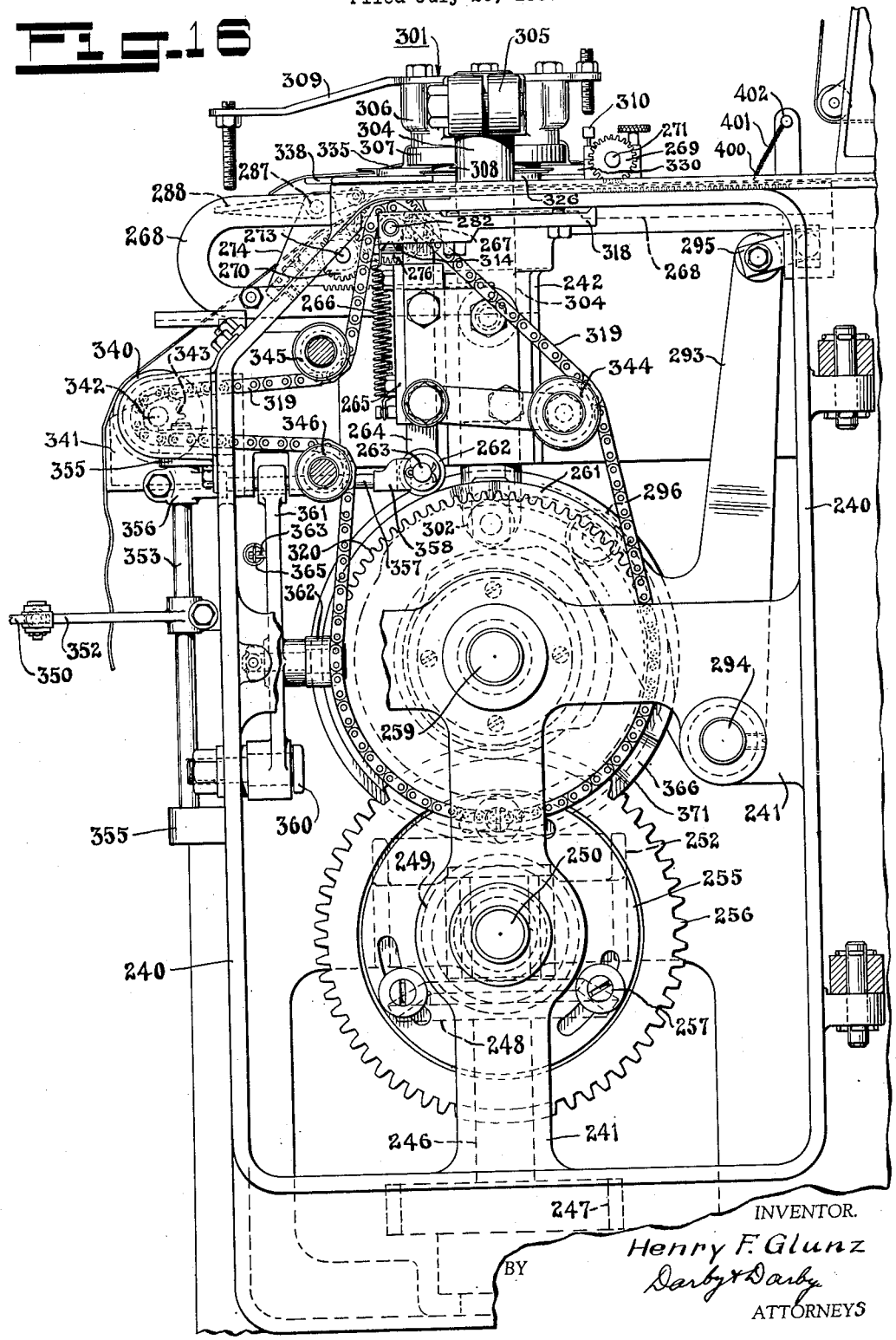

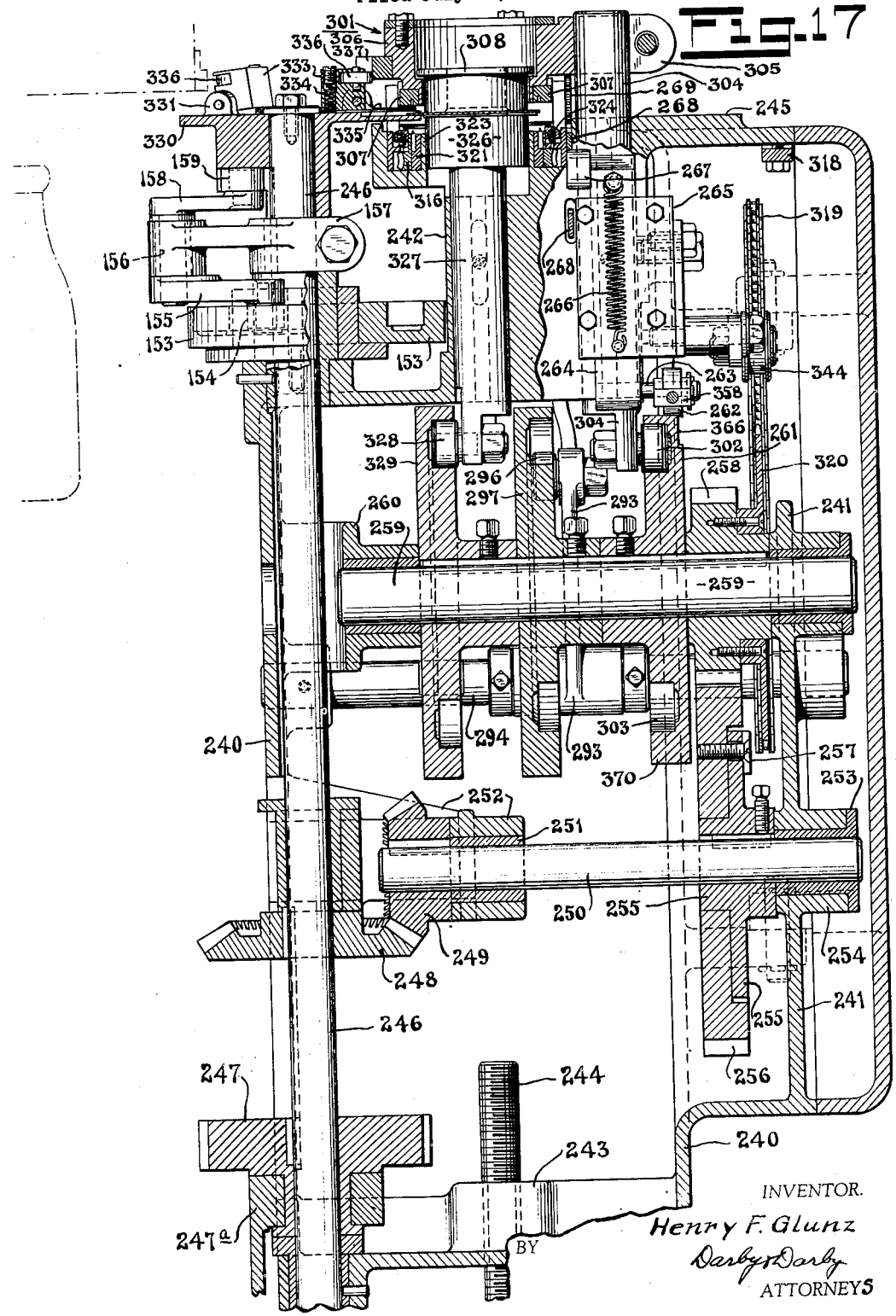

April 9, 1940.  H. F. GLUNZ  2,196,209
CLOSURE PREPARING AND FEEDING MECHANISM
Filed July 20, 1937   12 Sheets-Sheet 10
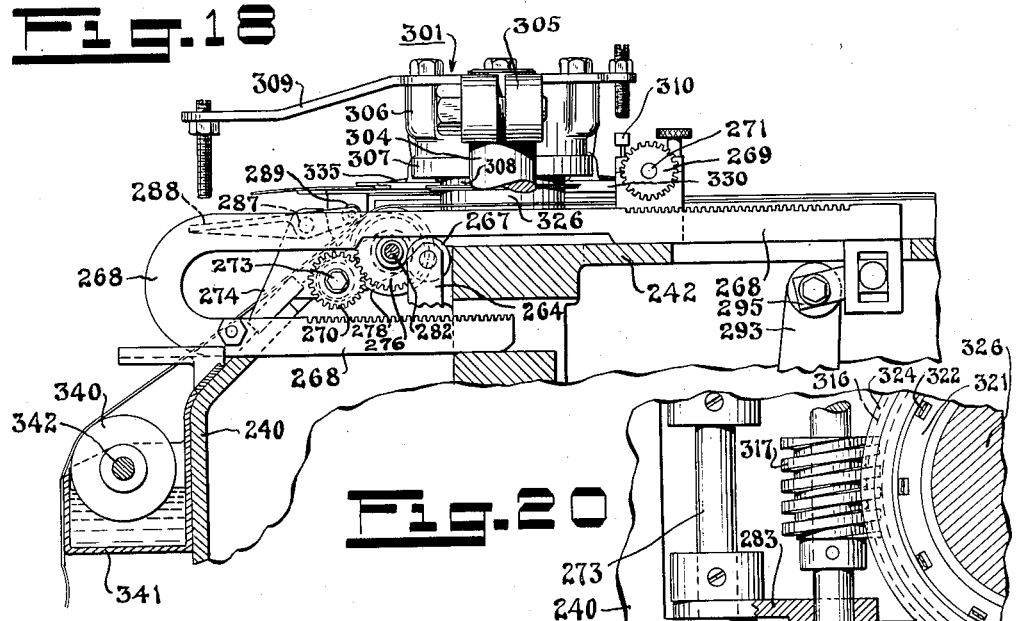
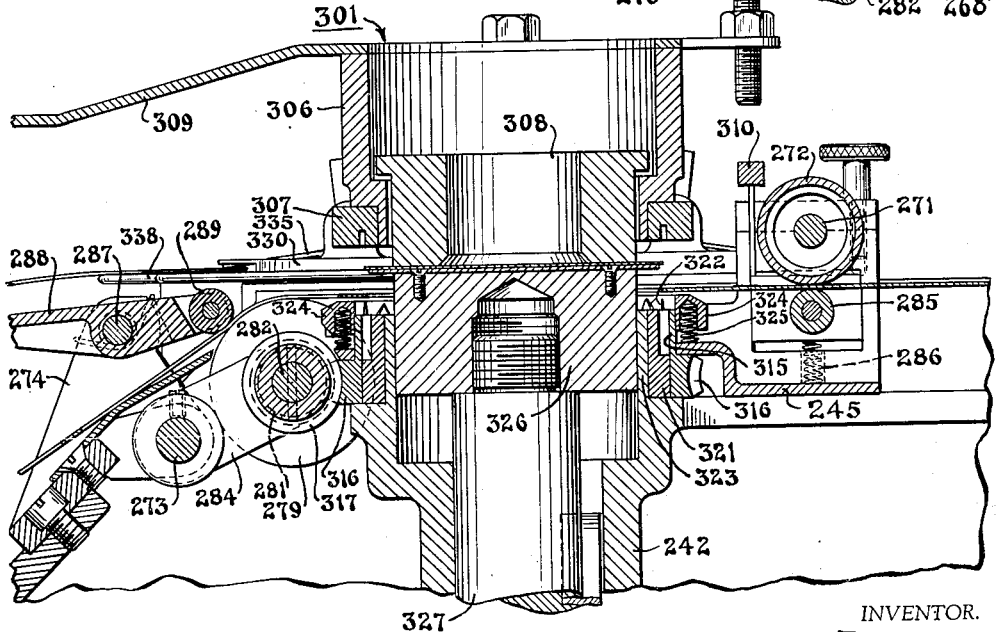
INVENTOR.
Henry F. Glunz
BY Darby & Darby
ATTORNEYS April 9, 1940.   H. F. GLUNZ   2,196,209
CLOSURE PREPARING AND FEEDING MECHANISM
Filed July 20, 1937   12 Sheets-Sheet 11
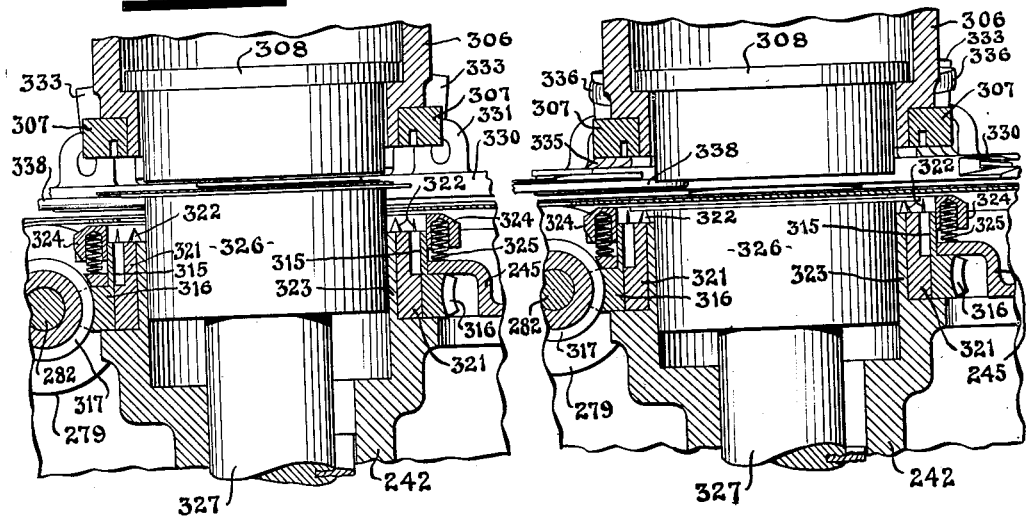
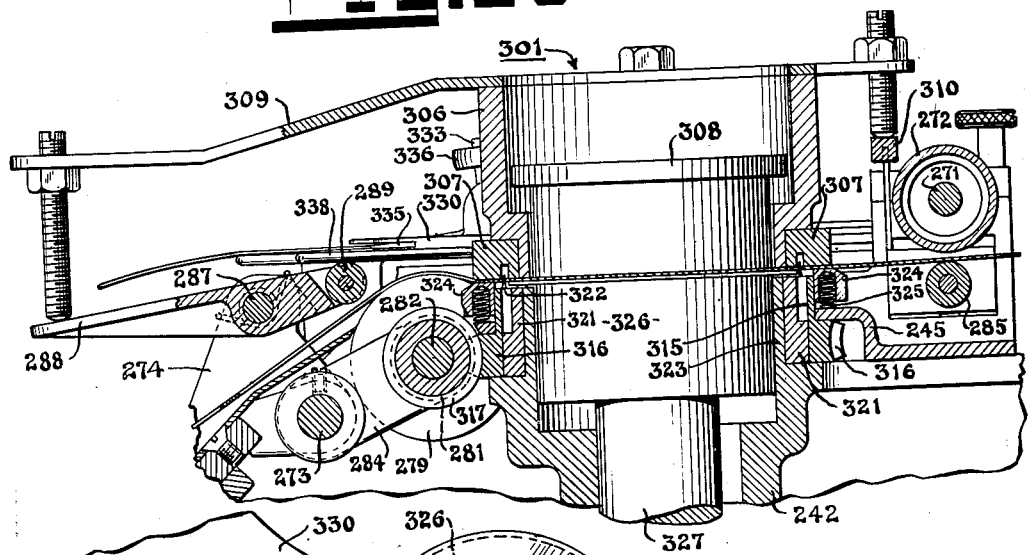
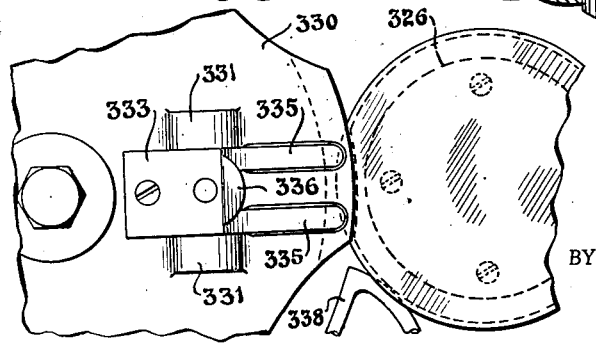
INVENTOR.
Henry F. Glunz
BY Darby & Darby
ATTORNEYS April 9, 1940.  H. F. GLUNZ  2,196,209
CLOSURE PREPARING AND FEEDING MECHANISM
Filed July 20, 1937   12 Sheets-Sheet 12

INVENTOR.
Henry F. Glunz
BY Darby & Darby
ATTORNEYS

Patented Apr. 9, 1940

2,196,209

UNITED STATES PATENT OFFICE 2,196,209

CLOSURE PREPARING AND FEEDING MECHANISM

Henry F. Glunz, Saratoga Springs, N. Y., assignor to Heat Seal Corporation, a corporation of Maine Application July 20, 1937, Serial No. 154,585

11 Claims. (Cl. 226—88.1)

The present invention relates to a machine for preparing and feeding closures to mechanism which in turn applies those closures to containers of various sorts.

It particularly relates to a machine for cutting blanks of cellulose acetate or like material to be used for sealing containers, and for feeding the blanks to position for application to the containers.

As illustrated, the machine takes the form of an attachment to be applied to a turret type capping device, the individual operating mechanisms of which are constructed in accordance with United States Patent No. 2,042,304. In the patent mentioned above, bottles are raised into cap applying position, whereupon a piston descends from above and holds the acetate or other closure to the bottle top. Thereafter, the bottle is further elevated and heat and pressure are applied to seal the closure to the container.

Two embodiments of my invention operating on the same general principles are shown and described in the specification. Of these, the first is the preferred form. Although both the described embodiments illustrate the preparation of caps for application to milk bottles, this is but one of many uses; other types of containers and of closures are contemplated.

An object of the invention is to provide a closure preparing and feeding mechanism for cutting discs from cellulose acetate and feeding them to position to be applied to containers.

Another object of the invention is to assure that the discs be smoothly cut and fed to container applying position in perfect condition without wrinkling or other deformation.

A further object of the invention is to dissipate static electricity which is present in the cellulose acetate in order to prevent the cellulose acetate from adhering to portions of the machine and thus causing difficulties in the operation thereof.

Other objects and features of the invention will appear in the following specification when considered in connection with the appended drawings, in which Figure 1 is a plan view of my invention showing also a portion of the turret head of a bottle capping machine to which the improvement of my invention is attached;

Fig. 2 is a transverse, sectional view of the machine taken on the line 2—2 of Figure 1;

Fig. 2A is a small scale developed view of the main operating cams of the machine showing the positions of the cam followers identical with that of Fig. 2;

Fig. 3 is an enlarged detail of the material feeding mechanism with certain portions cut away in order to more clearly show the feed rollers and their driving connections;

Fig. 5 is a view similar to Fig. 4 showing portions of the cutting head removed and showing also the use of a canvas belt to remove the scrap material from the machine;

Figs. 6, 7 and 8 are detail views of the cutting head showing the parts in various positions occupied during a cycle of operation;

Fig. 9 is a fragmentary bottom view of the cap feeding turret showing particularly the lugs for centering bottles in their cap applying position and showing likewise the plunger for removing the caps from the cutting head;

Figs. 10 and 11 are broken sectional views showing the relationship of the turret control cam and its follower to the turret itself. Fig. 10 differs from Fig. 11 only in that it shows the positions of the parts during a different portion of a cycle of operation of the machine.

Figs. 12, 13 and 14 are detail showings of the material feed mechanism, the various figures showing this mechanism in positions occupied during different portions of the machine cycle;

Fig. 15 is a plan view of the second embodiment of the invention;

Fig. 16 is a side elevation of the machine of Fig. 15 taken with the door demoved;

Fig. 17 is a transverse, cross-sectional view of the machine taken along the plane 17—17 of Fig. 15;

Fig. 18 is a fragmentary, longitudinal cross-section of the machine showing especially the feeding racks;

Fig. 19 is a fragmentary, longitudinal cross-sectional view showing the construction of the cutting and clamping means;

Fig. 20 is a fragmentary, horizontal section showing the mechanism for rotating the cutting drum and the means of supporting the forward feed rollers;

Figs. 21, 22 and 23 are views similar to Fig. 19 but showing the positions of the parts during various portions of the machine cycle;

Fig. 24 is a detailed view of the construction of the disc clamping fingers;

Figure 1:
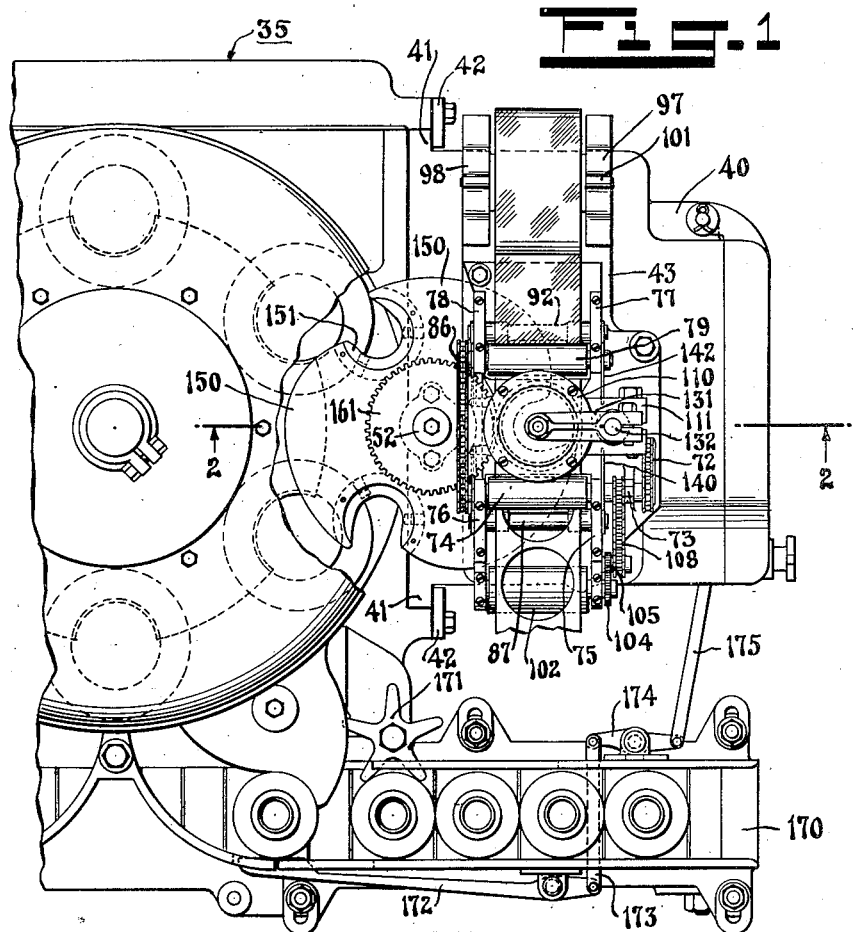

The machine of this invention is supplied with flexible transparent material, as cellulose acetate, in the form of a roll or strip, this material being intermittently fed to clamping and cutting heads, which heads move into position to grip the material and hold it taut while cutting knives are rotated to cut a disc from the material.

After a disc has been cut a plunger operates within the cutting head, pushing the disc therefrom and inserting it in one of a number of compartments in a feeding turret at a time when this turret is completely stopped. Thereafter, the turret rotates, carrying the closure disc to position in alignment with a container carried in any suitable manner, as by another turret.

As the two turrets rotate the bottle moves along with the closure disc above it and when the closure disc and bottle top are in exact register a plunger within the bottle turret descends to hold the disc against the bottle top. As the turrets continue to revolve the closure is removed from its compartment in the feeding turret and thereafter the mechanism of the bottle turret seals the disc to the bottle neck in any suitable manner, for example in the manner described in the above mentioned Patent No. 2,042,304.

First Embodiment

In describing the invention the preferred embodiment will be considered first.

Framework

The various parts of the machine are supported in a box-like main casting 40 (Figs. 1 and 2) the flanged left hand vertical edges 41 (Fig. 1) of which are held in guideways of the bottle capping machine 35 by means of the clamping bars 42.

Casting 40 is movable in a vertical direction to align the feeding head with the tops of bottles of different heights as quarts, pints and half-pints, and is held in any desired position by means of an adjustment screw threaded into the bottom of casting 40 and cooperating with a stationary surface which may be the floor or an extension of the capping machine base. This construction is shown and described in detail in connection with the second embodiment of the invention.

Fastened to the top of the casting 40 (Figs. 1, 2 and 3) is an auxiliary casting 43 which serves to support various feed roller shafts hereinafter described. A central boss of casting 43 also cooperates with a clamping ring (later described) to hold the material in position during cutting of a cap.

Fastened to a block-like portion 44 (Fig. 2) of the casting 40 is another auxiliary casting 45 containing supports for various of the driving shafts of the machine.

The framework is completed by a plate 46 extending across the casting 40 near the bottom thereof and serving to support one end of the cam shaft 54.

Driving mechanism

The driving mechanism comprises a cam shaft 54, turret shaft 52 and feed shaft 58 (Fig. 2). Cam shaft 54 is supported at its upper end in a bushed boss in casting 45 and at its lower end in a similar boss of plate 46. Keyed to the shaft just above the boss is a pinion 53 which meshes with a gear 51 keyed to turret shaft 52. Shaft 52 extends vertically through the machine and is supported by a bushed boss in the lower portion of casting 40, and in a bushed hole in portion 44 of that casting.

Gear 51 meshes with a broad faced gear 50 which is driven from the main drive of the cap applying machine. Thus as the cap preparing and feeding mechanism is raised and lowered, as hereinafter described, the gear 51 moves along the gear 50 but is always in mesh therewith.

It will be obvious from the above that shafts 52 and 54 rotate in timed relationship. In the present embodiment of the invention, gears 51 and 53 are so proportioned that the speed of shaft 52 is one-third that of shaft 54, this proportion being variable, however, and depending upon the number of closure compartments in the turret head.

Material feeding mechanism

Mounted on the upper end of shaft 54 is a spiral gear 55 (Figs. 2 and 12) which meshes with a similar gear 56 on the shaft 58 supported in bearings 57 integral with casting 45. A crank arm 59 is fixed to the opposite end of shaft 58. Pivoted to the crank arm 59 is a link 60 (see Figs. 12, 13 and 14) which at its upper end is pivoted to a crank arm 61 freely rotatable about a sleeve on the stub shaft 63, which shaft is screwed into the side of the block 44.

Pivoted on the crank arm 61 is a pawl 62 which cooperates with a ratchet wheel 64 rotatable about a sleeve on the shaft 63. The pawl is held against the ratchet wheel by a spring 65 extending from the pawl to the crank arm 61.

Fixed to the ratchet wheel 63 through the medium of a sleeve is a sprocket wheel 70 between which and a similar sprocket wheel 71 extends a chain 72 (Figs. 2 and 3).

Figure 4:
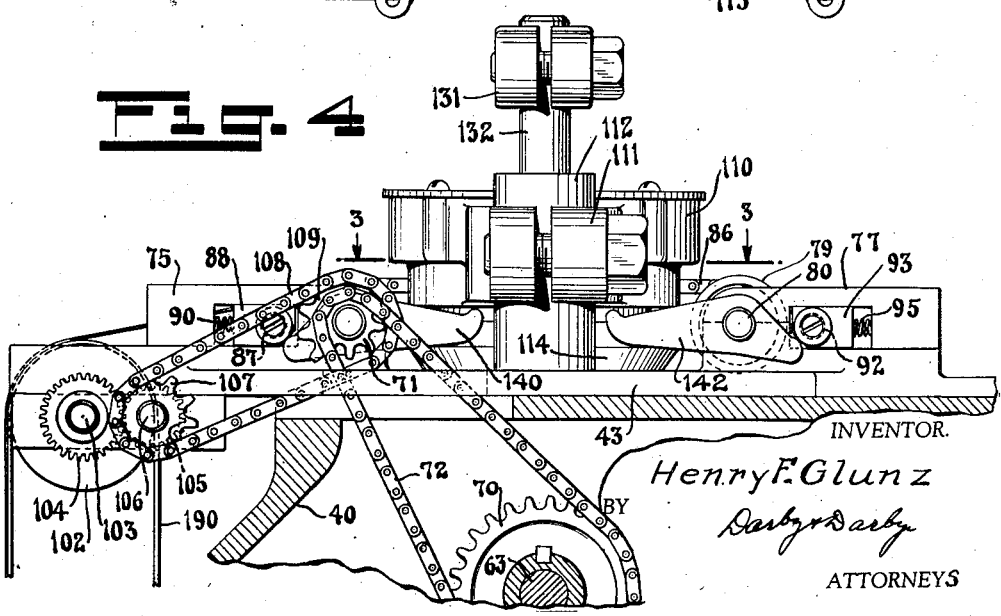
Fig. 4 is a cross-sectional view taken on the line 4—4 of Fig. 1, showing particularly means for releasing the material feed and idler rollers.

Sprocket wheel 71 is mounted on the shaft 73 of a feed roller 74 (Fig. 3), which feed roller is supported in bearings made integral with the plate 43 and held in the bearings by means of the bearing caps 75 and 76 (Figs. 3 and 4).

Similarly supported by bearings in plate 43 and bearing caps 77 and 78 is a second feed roller 79 on the shaft 80 of which a sprocket wheel 81 is fixed, this sprocket wheel being joined to a sprocket wheel 85 on the shaft 73 of feed roll 74 by a chain 86. Bearing against the feed roller 74 is an idler roller 87, which roller is supported by slidable blocks 88 and 89 reciprocable in slots formed in bearing caps 75 and 76 and spring pressed against the roll 74 by springs 90 and 91 extending between the ends of the slots and the blocks 88 and 89. A similar idler roller 92 is supported in slidable blocks 93 and 94 and is pressed against the feed roller 79 by springs 95 and 96.

Supported on casting 43 by the upwardly extending brackets 97 and 98 is a shaft 101 (Fig. 1) on which a roll of cellulose acetate or other closure material is supported. Material from this roll is fed over the idler roller 92, thence under the feed rollers 79 and 74, thence over the idler roller 87, to a scrap roller 102. Scrap roller 102 is mounted on a shaft 103 (Figs. 4 and 5), which shaft is rotatably supported in a forward extension of casting 43. Shaft 103 has mounted thereon a gear 104 which meshes with gear 105 mounted on a stub shaft 106. Likewise mounted on shaft 106 is a sprocket 107 which is driven by a chain 108 from a sprocket 109 fixed on shaft 73 (Fig. 3). The gears 104 and 105 and sprockets 107 and 109 are so proportioned that scrap roller 102 rotates slightly faster than the feed roller 74 assuring that slack will be constantly taken up. The scrap roller 102 will be considered more in detail hereinafter in connection with the means for eliminating the effect of static electricity present in the cellulose acetate.

It will be seen from the above that as the main shaft of the machine revolves the feed rollers are intermittently rotated to cause a definite length of material to be fed forward under the cutting head during each rotation of the shaft 54, this feeding of material occurring during the first half of each cycle of operation.

When no bottle is in capping position it is desirable to suspend the feeding of material; means for causing such suspension is hereinafter described.

Cutting head

Mounted between the feed rolls 74 and 79 and centered longitudinally of the strip of cellulose acetate is a cutting head, through the operation of which discs are severed from the cellulose acetate.

The cutting head comprises a cylindrical shell 110 (Figs. 2 and 6) having an integral split arm 111 which is clamped about the sleeve 112. Extending through the rim of shell 110 are screws 113 which are threaded into a clamping ring 114 and are free in the shell 110. Extending into opposing bores in the shell 110 and ring 114 are springs 115 which tend to spread the two elements apart. The movement of the clamping ring 114 away from the shell 110 is limited by the heads of the screws 113.

Rotatable within the shell 110 is a cutting drum 116 which at its upper portion is enlarged to provide a bearing for the drum against the upper edge of the shell 110. Fastened to the lower periphery of the drum 116 is a saw blade 117 which is bent into cylindrical form and held in position by the screws 118.

Gear teeth 119 are formed on the outer upper edge of drum 116, these teeth meshing with a gear on the turret shaft which gear is hereinafter described.

Sleeve 112 passes through a bore in the block 44 of casting 40 (see Fig. 2) and carries at its lower end a split clamping member 120. Member 120 carries a cam following roller 121, which roller lies in a groove in the cutting head control cam 122. Cam 122 is fixed to the shaft 54 and rotates therewith. As will be shown when the machine operation is considered, the contour of this cam is such that the cutting head descends once during each rotation of the cam shaft 54.

In order to properly align the parts and assure correct positioning of the cutting head the shell 110 has a vertical slot cut in its face in which slides an upstanding finger 123 fixed to casting 43 (Figs. 2 and 3).

Disc removing plunger

After a disc has been cut from the material by the knives of the cutting drum there is a tendency for it to remain within those knives. In order that the cut disc may be removed from the knives and inserted in a compartment in the feeding turret a plunger 125 (Fig. 6) is provided, this plunger being supported at the lower end of a rod 126 which is slidably mounted in a hub 127 of drum 116. Compressed between the hub and a washer 128 on the rod is a spring 129 (Fig. 2) which tends to hold the plunger 125 in its upper position. Held between nuts 130 threaded on the rod 126 is a boss made integral with a split clamping arm 131 which arm is fixed to the upper end of rod 132, which rod extends through bushings in the sleeve 112 and is slidable in a vertical direction. Rod 132 carries at its lower end a split clamping arm 133, on which a cam following roller 134 is rotatably mounted. Roller 134 rides in a groove in a box cam 135, which cam is fixed for rotation with shaft 54.

Idler roller release

When the clamping ring 114 is in its lower position it cooperates with the raised ring or boss 136 (Figs. 5 and 6) of casting 43 to hold the material in position during the cutting of a disc therefrom. While the material is so held it is desirable that there be no grip on the material by the feed rollers. In order to release the grip of the feed and idler rollers at this time levers 140, 141, 142 and 143 (see Figs. 3 and 5) are provided. One of these levers is pivoted at each end of each of the feed roller shafts 73 and 80 and has cooperating with it either the undersurface of the clamping arm 111 of shell 110, or one of the fingers 144 made integral with that shell (Fig. 1). The opposite ends of these levers bear against curved portions of the blocks 88, 89, 93, or 94 to cause these blocks to move in their slots against spring tension. Since the blocks serve as supports for the idler rollers 87 and 92, it will be obvious that as the head descends the idler rollers are moved away from the feed rollers to release the material.

Disc feeding turret

The caps or discs after being cut from the material are lowered as indicated hereinabove and caused to seat in compartments in a rotatable turret which carries the discs to position to be operated upon by the capping mechanism. The turret 149 for causing this feed comprises a plate 150 which is rotatably mounted on the shaft 52 and which has formed therein a number of compartments for receiving the discs or caps.

Each compartment comprises a marginal semicircular hole with beveled upper edges. The angle of the bevel is such that the diameter at the plate surface is equal to that of a blank or closure. Beneath each hole is a semi-circular ring 151 held in a pocket in the underside of plate 150, by means of springs 152 (see Figs. 6, 7, 8 and 9). As will be seen by reference to Figs. 2 and 6, when the plunger 125 descends it carries with it a closure disc which rides against beveled edges of the hole, snaps under the plate 150, and is held in position between the plate 150 and the ring 151 by the pressure of springs 152. Fastened to each ring 151 are lugs 162 which serve to engage the tops of bottles and center them with respect to the compartment and disc therein.

The turret 149 is caused to rotate at a variable speed by means of mechanism intermediate the turret and the shaft 52. This mechanism comprises a cam 153 (Figs. 2, 10 and 11) which in the present instance is three-lobed, but which may have any number of lobes, depending solely upon the number of compartments provided in the plate 150. In the groove of the cam 153 is a cam following roller 154, which is supported on an arm 155, which arm is in turn fixed to a shaft 156. Shaft 156 extends through a bearing formed in the outer end of arm 157, which arm is clamped to and rotates with the shaft 52. On the other end of shaft 156 is a short arm 158 on which is pivoted a block 159 (see Fig. 10) which block lies between the tines 160 of a downwardly extending forked portion of the turret plate or casting 150.

It will be seen that as the shaft 52 rotates the roller 159 in following a circular portion of the cam groove of cam 153, causes the turret 149 to rotate at the same rate as shaft 52, and that when the roller 154 is following one of the lobed portions of the cam it first causes the speed of the cap turret to decrease with respect to that of the shaft and subsequently to increase, the cam being so designed that at three instants during each rotation of the shaft the turret is completely stopped. The timing of the machine is such that when the turret 149 is stopped a disc receiving compartment lies directly under the plunger 125.

A gear 161 is mounted on the shaft 52 and fastened to the turret plate 150 for rotation therewith. The teeth of this gear mesh with the teeth 119 of the cutting drum 116 to drive that drum.

Feed mechanism control

As was indicated above, it is desirable to cause a cessation of the material feed when no bottle is present to receive a cap. Means for controlling the material feed mechanism is shown in Figs. 1, 12, 13 and 14. Referring to Fig. 1 it will be apparent that bottles are fed to the bottle capping machine 35 along the conveyor 170, these bottles moving from the conveyor into the rotating bottle turret as timed by the star wheel 171.

A trip lever 172 is pivoted on the side of the conveyor 170 in position to be held outwardly by any bottle which is on the conveyor at a point beyond the star wheel 171. When a bottle is not present the trip lever is moved inwardly under spring tension, moving the lever 173 and causing a pull to be exerted on one end of lever 174. The other end of lever 174 is joined by a link 175 to an arm 176 (Figs. 2 and 12) which is rotatably mounted in a frame 177 fastened to the stub shaft 63, Fig. 12. Fixed for rotation with the arm 176 is an arm 178 which is adapted to cooperate with a pin 179 on pawl 62. When a push is exerted on link 175 the arm 178 moves towards the ratchet wheel 64 and upon the return counterclockwise movement of the crank arm 59 and pawl 62, pin 179 strikes the surface of lever 178 and causes the pawl to be lifted out of engagement with the ratchet wheel, as shown in Fig. 12. As long as lever 174 remains in this position the oscillation of pawl 62 is ineffective to move the ratchet wheel and material feed is suspended.

Since provision is made for the feeding of two bottles to capping position after operation of the trip mechanism just described, it is obvious that there must also be two caps provided. These two caps are provided as will be obvious, since there is one cap already in a compartment of the turret, and a second cap being prepared during the return stroke of the pawl and prior to its disengagement from the ratchet wheel.

Operation

In describing the operation of the machine reference will be made chiefly to Fig. 2 which shows the positions of the parts at the beginning of a material feed cycle. Reference will also be made, however, to Figs. 2A, 10 and 11, which figures show the relationship of the cam grooves in the various controlling cams; and to Figs. 6, 7 and 8 which show various positions of the cutting head and plunger.

As the shafts revolve the material feeding mechanism already described in detail is operated and causes a length of material to be fed between the clamping rings.

When the feeding operation has been completed, that is to say when the crank arm 59 is in its lower dead center position, the turret will have rotated beyond one of the lobes of the cam groove (Figs. 10 and 11) and the speed of the turret will be normal. Shortly after the completion of the feeding operation, cam 122 will rotate to such a position that cam follower 121 is moved downwardly (Fig. 2) to lower the cylindrical shell 110, causing clamping of the material between the clamping ring 114 and the cooperating ring 136 of the casting 43 (Fig. 7). At this time the idler rollers will have been moved away from the feed rollers as described above. At the same time, as the cylindrical shell 110 is caused to descend, rotation of cam 135 causes cam follower 134, and through the cooperating parts already described, plunger 125 to descend at the same rate as the cylindrical shell. After the material has been clamped in the manner described the cutting drum 116, which is being rotated through the medium of gear 161 and the teeth cut in the shell 110, continues to be lowered, causing the teeth of blade 117 to pass through the material and cut a disc therefrom (Fig. 7). As the cycle continues, cam 135 (Fig. 2A) causes cam follower 134 and the cooperating parts to descend an additional amount (Fig. 8), whereby the plunger 125 presses against the cut disc and deposits it in a compartment of the turret 149.

It is to be noted that holes are provided in the plunger 125 in order that the disc of cellulose or other material will be moved downwardly in contact with the plunger, rather than by air pressure built up between it and the plunger, thus assuring a positive positioning of the disc in the compartment. It is also to be noted that at the time when the plunger descends the cam follower 154 will be in such a position on the lobe of the cam that the turret 149 will be entirely stopped.

After the disc has been deposited in the compartment the plunger 125 and the cutting head or cylindrical shell 110 move upwardly under control of their respective cams 122 and 134. The plunger 125, however, starts to move first so that both are restored to their normal positions as shown in Fig. 2, prior to the completion of a rotation of the drive shaft 54.

At the time when plunger 125 and the cylindrical shell 110 have returned to their upper positions the crank arm 59 will have just passed through its upper dead center position, and another feeding operation may commence.

The caps which have been deposited in compartments of the turret 149, as has been indicated, are removed from these compartments while the turret is rotating, these caps being removed due to pull exerted upon them by the rotation of the capping turret of the machine through the medium of the bottle and the clamping plunger cooperating therewith as mentioned above and described in detail in Patent No. 2,042,304. The caps, as will be seen upon consideration of the opensided construction of the turret compartments, simply slide out sideways from the compartments as the cap turret rotates.

Second Embodiment

The second embodiment of my invention is shown in Figs. 15 to 24. While generally similar to the mechanism just described, it differs in details particularly in that the feeding turret utilizes a different mode of transporting the caps to the capping position and because of this different mode the caps themselves are raised into position to be seized by fingers on the turret instead of being moved into the compartments under action of a plunger.

Framework

The framework of the mechanism comprises a casting 240 which is similar to the casting 40 insofar as its outlines are concerned, but has within it, near its outer edge, a web 241 serving to support various of the driving shafts. Casting 240 is also supplied with a depending block-like portion 242 in and on which certain slides and plungers hereinafter to be described are mounted.

In the bottom of the casting 240 there is a boss 243, in which is threaded the adjustment screw 244 (Fig. 17). The head of this adjustment screw seats against the floor or against an extension of the base of the capping mechanism, and is utilized, as was hereinable described, for the purpose of properly locating the cap feeding mechanism to operate upon bottles of any size, for example quarts, pints or half-pints.

Mounted on top of the box-like casting 240 is an auxiliary casting 245, in which there are bearing surfaces for supporting the feed and idler roller shafts, as well as portions of the mechanism for rotating the cutting head.

Driving mechanism

The main drive shaft 246 (Fig. 17) extends vertically and is supported in bosses in the casting 240. This shaft carries gears which drive horizontal shafts conveying motion to the various cams and control levers.

At the bottom of shaft 246 is a gear 247 which is adapted to mesh with a gear forming part of the drive of the capping mechanism. The gear 247 is held in mesh by a fork 247ª which extends from the frame of the main capping mechanism; the shaft 246 slides vertically in the gear hub.

Fixed to the shaft 246, slightly above the gear 247, is a bevel gear 248 which meshes with another bevel gear 249 fastened to the shaft 250. Shaft 250 is supported at its left hand end (Fig. 17) in a bushing 251 in a boss 252 integral with casting 240, and at its right hand in a bushing 253 in a boss 254 of the web 241.

Mounted near the right hand end of the shaft 250 is a hub 255 on which is a gear 256 (Figs. 16 and 17). The hub 255 and gear 256 are fastened together by the screws 257 which pass through slots in hub 255 and thus provide for adjustment of the gear with respect to the hub. Meshing with gear 256 is a gear 258 which is keyed to a shaft 259, supported at one end by web 241 and at the other end in a bearing 260 of the main casting 240. Shaft 259 carries on it the various cams for controlling machine operations, which will be described in detail hereinafter.

Material feeding mechanism

In this embodiment of the machine the material feeding mechanism comprises a rack which is caused to mesh intermittently with gears mounted on the feed roll shafts; the determination of the meshing or non-meshing condition of the rack with the gears being under control of cams on the cam shaft 259.

Mounted on the shaft 259 adjacent the gear 258 is a cam 261 against the cylindrical edge surface of which a cam roller 262 bears. This cam roller is slidably mounted on a pin 263 fixed to a slide 264 (Fig. 16) which moves vertically in guideways in the portion 242 of casting 240 being held in the guideways by plate 265. The slide 264 and roller 263 are held in their lower position by spring 266 which extends from a pin on slide 264 to a pin in the plate 265 (Figs. 16 and 17). On the upper end of the slide 264 is a roller 267 which bears against the lower edge of a rack bar 268 (Fig. 17), this bar being made in J-shape and having teeth cut on the upper side of both arms of the J.

When the slide 264 is in its upper position teeth on the rack 268 mesh with the gears 269 and 270.

Gear 269 is fixed to the shaft 271 of feed roller 272. Gear 270 is mounted on a shaft 273 which is supported in bracket structure 274 fastened to casting 240 (Figs. 18, 19 and 20).

Shaft 273 carries on the opposite end a gear 275. Gears 270 and 275 mesh respectively with gears 276 and 277 integral with the right and left hand (Fig. 15) feed rollers 278 and 279. The feed rollers 278 and 279 are rotatably mounted on sleeves 280 and 281 which are loosely mounted on a shaft 282, and integral arms 283 and 284 of which are mounted on shaft 273. Due to this construction shaft 282, which is described hereinafter, may rotate within the sleeves 280 and 281 while the feed rollers 278 and 279 rotate independently about the outer surface of the sleeves.

Directly beneath the feed roller 272 (see Fig. 19) is an idler roller 285 which is supported in brackets slidably mounted in upright extensions of the auxiliary casting 245 and normally held in upper position by means of the springs 286.

Pivoted on a shaft 287 supported in the brackets 274 is a bail 288 which carries in a fork at its right hand end an idler roller 289 which bears against the rollers 278 and 279.

A roll of cellulose acetate or other material is mounted on a reel 291 (Fig. 15) which is supported on a shaft 292 carried in upward extensions 243 of the auxiliary casting 245.

Figure 26:
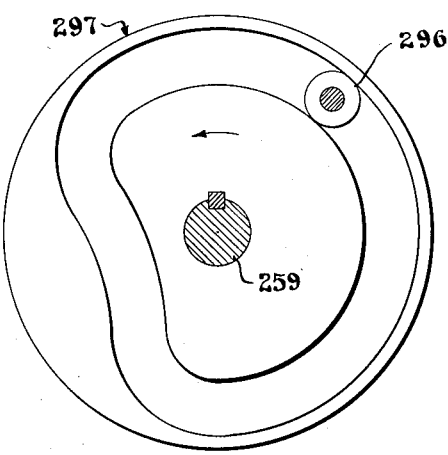
Figure 27:
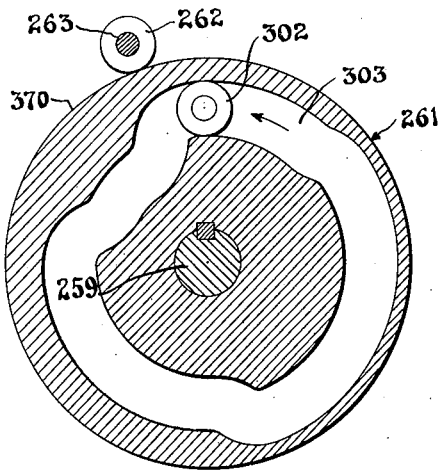
Figure 28:
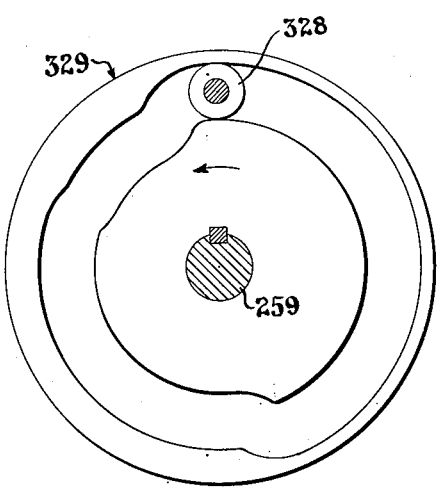

The rack 268 is adapted to be reciprocated by means of a bellcrank lever 293 which is pivoted to a shaft 294 supported in the web 241 and the casting 240 (Figs. 16 and 17). The long arm of bellcrank 293 carries a link 295, a pin on which rides in a slide in a downward extension of the rack 268. The short arm of the bellcrank 293 carries a cam following roller 296 which rides in a groove in a cam 297. The shape of this cam groove is shown in Fig. 26 and will be referred to hereinafter. As the cam rotates, the bellcrank 293 rocks upon its pivot and causes the rack 268 to move backward and forward. During each forward movement (if the bottle trip has not been operated) the rack will be in its upper position, due to upward movement of the slide 264, and the feed rollers 272, 278, 279 will be rotated in a counterclockwise direction (Fig. 16) to cause a definite length of material to be fed from the roll and into position for severing from the strip.

Means are provided and will be described hereinafter to remove the idler roller from the feed roller in order to release the material from any tension of the feed rollers during the cutting operation.

Clamping head

Located between the feed rollers centrally of the strip of material is a clamping head 301 (Figs. 17 and 19) which is adapted to be raised and lowered under control of a cam groove 303 in the surface of cam 261. Cam follower 302 which rolls within the groove is fastened to a rod 304 which extends upwardly through a bore in member 242 and carries at its upper end a split clamp 305 made integral with the hollow cylindrical portion 306 of the head 301. Fixed to the cylindrical portion 306 at its lower edge is a clamping ring 307, which has a groove in its lower surface in which the cutting knives rotate during the cutting operation.

Fitting within the clamping head 301 is a weight or plunger 308 which is normally supported by an inwardly extending flange of the cylinder 306, but which at certain times during the operation rests upon a disc cut from the strip of material in order to retain the disc in position on a disc elevator hereinafter described. A three armed member 309 is fastened to the upper rim of the cylindrical portion 306 of the cutting head 301. Each arm of this member has a downwardly extending screw therein. The two rearward screws cooperate with upward extensions 310 of the idler roller supporting brackets and bear upon them to release the tension of the feed and idler rollers on the material, as the clamping head descends. The forward one of the three screws cooperates with the forward extension of bail 288 to release the tension on the material at the forward feed rollers 278 and 279.

The clamping head, as will be seen from the foregoing, moves up and down under control of the cam groove 303 in cam 261, and serves to hold the material during the cutting operation.

Cutting head

The mechanism for severing a disc from the strip of material comprises a rotating cutting head against which the material is caused to be pressed during each cycle of the machine so that knives carried by the head penetrate the strip of material, and due to their rotation sever a disc therefrom. The cutting head comprises a hollow cylinder 315 (see Fig. 19), the lower edge of which is formed as a worm wheel 316, which cooperates with a worm 317 (Fig. 20) mounted on shaft 282, which shaft is supported in the sleeves 280 and 281 and in the bracket 318 fixed to the underside of casting 240 and is driven, through the medium of a sprocket wheel 314 (Fig. 16) and chain 319, from the sprocket wheel 320 fastened to gear 258. Within the cylinder or hub 315 is a second hub 321 which is fixed for rotation with the hub 315, and which has along its upper outer margin tooth-like spaces in which the cutting knives 322 are fastened.

The hub 315 is rotatably mounted on an upwardly extending sleeve-like flange 323 of the portion 242 of casting 240.

A portion of the casting 245 is offset upwardly sufficiently so that the edges of a hole drilled therein lie above the worm wheel portion 316 of the cylinder 315. A clamping ring 324 is supported from the edge of this offset piece by means of springs 325, clamping ring 324 cooperating with the clamping ring 307 to hold the material as was described hereinabove.

Cap elevator

Within the sleeve 323 is the cap elevator 326 which is connected by rod 327 with a cam following roller 328 which rides in a groove of cam 329. As the cam 329 revolves it causes a rise and fall of the elevator 326, which elevator serves to position a cut disc or blank for seizure by fingers on the feeding turret, as will be described later.

Cap feeding turret

In this embodiment of the invention discs cut from the material are seized by fingers on a turret and rotated to bottle capping position. Although the disc carrying mechanism of the turret is different from that in the embodiment previously described, the means for driving the turret are identical and will therefore be mentioned only briefly. Those parts which are identical are given the same reference characters which they bore in connection with the first embodiment and reference is made to Figs. 10 and 11 in connection therewith.

A cam 153 is mounted on a boss of the casting 240 and is held stationary; a cam following roller 154 moves in the groove thereof. Cam follower 154 is rotatably mounted on an arm 155 mounted on shaft 156 which is carried in a boss of the arm 157, which arm is clamped to the main drive shaft 246. At its opposite end shaft 156 carries an arm 158, a pin on the opposite end of which lies in a block 159 within the bifurcated portion of a downwardly extending rib on the turret head 330. Due to the construction described the turret head 330 rotates at variable speed being stopped during a short portion of each machine cycle. The turret head 330 has three lobes which are horizontally slotted to form compartments in which blanks or discs may be held (Fig. 24).

Supported in brackets 331 on the turret head 330 are shafts 332 (Fig. 17) each of which has clamped thereon a block 333. Each block 333 has a spring 334 extending therethrough and tending to rotate the block in a clockwise direction. Each block has extending toward the rim of the turret plate a pair of fingers 335 adapted to project through slots in the upper wall of the corresponding lobe of the turret plate 330 and to bear against the base of the horizontal slot therein (Fig. 23).

Each block 333 carries a roller 336 which is adapted to ride against the surface of a cam plate 337 (Fig. 15) fixed on the clamping head 301. As the turret revolves the rollers 336 successively make contact with the cam plate 337, lifting the fingers 335 from the base of the slots in lobes of the plate and permitting the horizontal slots to move across the edge of a disc. Shortly after the disc has been so positioned the cam plate 337 will rise with the clamping head and, under action of the springs 334, fingers 335 will be lowered against the bottom of a slot in plate 330, holding the disc to that plate and retaining it in position on the plate until it is removed by the bottle capping mechanism in the manner indicated above.

Since only the edge of a blank or cap lies in the slot of a cam lobe and is held by the fingers 335, and since the material is flexible and tends to bend, means are provided to support the body of the blank as the turret rotates to position for application of the cap to a bottle.

The means mentioned above comprises the curved rails or bars 338 which extend from adjacent the cutting head to a position adjacent the capping position and are supported by an arm 339 fastened to the casting 240.

Scrap roller

In order to conduct the cut strip or scrap material from the machine a roller 340 (Figs. 15 and 16) is provided. This roller is supported in bearings in a water box 341 which is bolted to the main casting 240 at the front thereof (Figs. 15 and 16). Fastened to the end of the scrap roller shaft 342 is a sprocket wheel 343 over which the chain 319 passes. The chain 319 passes over the sprocket wheels 314 and 320 and over the guiding and tensioning rollers 344, 345 and 346 (Fig. 15).

Due to the fact that the box 341 is constantly filled with water the material tends to adhere to the roller 340 and is thus drawn from the feed rollers 278 and 279 and deposited in a scrap receptacle.

Feed control mechanism

As in the embodiment first described means are provided to render the feeding mechanism inoperative when containers are not supplied to the capping mechanism.

This means comprises a bottle tripping lever similar to that described in connection with Fig. 1. A link 350 (Fig. 15) connected to this trip lever is in turn connected by means of the adjustable rod 351 to an arm 352. Arm 352 is fastened to a shaft 353 rotatably supported in brackets 355 fastened to the outside of casting 240 (Fig. 16).

Clamped to shaft 353 above the arm 352 is another arm 356 which carries a rod 357 on the end of which is a saddle piece 358 the tines of which project on either side of the cam roller 262 of the rack raising mechanism (Fig. 17).

Rotatably mounted on a pin 360 fastened to casting 240 is an arm 361 which is forked at its upper end to engage the rod 357. Arm 361 also carries a cam roller 362 and a pin 363 between which and a fixed part of the machine a spring 365 is stretched.

Figure 25:
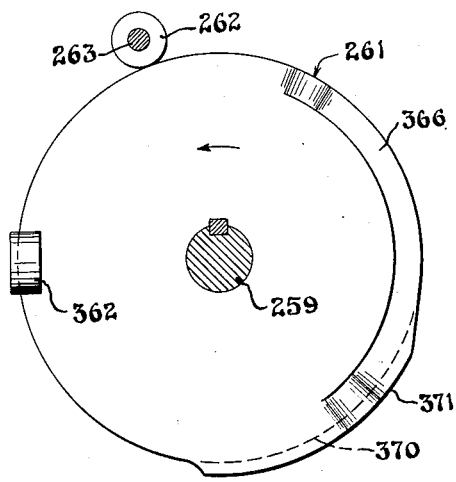
Figs. 25, 26, 27 and 28 are detailed views of the various cams showing the shapes thereof and the positions thereof with respect to their respective cam followers when the machine is stopped at the instant illustrated by Fig. 17.

The cam roller 362 cooperates with the surface 366 (Fig. 17) of cam 261 (see also Fig. 25) so that during each revolution of the cam the roller enters a depression in surface 366 and the arm 361 moves rearwardly a slight amount thus moving rod 357 and causing cam roller 262 to shift on its pin 263 to lie on the edge 370 of cam 261. During the remainder of the rotation the cam roller 262 lies on edge 371 of cam 261 as shown in Fig. 17.

If a bottle is present on the conveyor and the trip lever thus held in operated position then the arm 352 will be moved to hold rod 357 forwardly and to prevent cam roller 362 from entering the depression in surface 366. Thus while bottles are passing the trip lever the roller 262 remains on surface 371 and the rack bar 268 is raised once during each revolution to cause feeding of the material.

When no bottle is on the conveyor in position to operate the trip lever the spring 365 moves the cam roller 362 against surface 366 and, when the depression in that surface comes opposite the roller, the cam roller 362 is shifted to surface 370 and remains there until the raised portion of surface 371 has passed the roller 262. The cam surfaces are so proportioned that when the roller 362 is moved forwardly due to the end of the depression in surface 366 passing under it, the cam roller 262 moves onto the surface 371 but beyond the raised portion. Thus when there is no bottle on the conveyor the cam roller 262 moves alternately from surface 370 to 371 and back but always is on a cylindrical surface and so does not cause the rack 268 to be raised.

Due to the synchronization of the bottle feeding wheel with the cam drive a bottle cannot come to position to operate the tripping lever at a time when cam roller 262 lies on surface 371 behind (Fig. 17) the raised portion of surface 370, and therefore there can be no incorrect operation of the machine nor breakage of parts. Moreover, the trip lever is not moved by a bottle but is simply held in position after being moved by cooperation of roller 362 with the surface 366.

Operation

In describing the operation of the machine reference will be made to Figs. 10, and 25 through 28, which show the positions of the various cams with respect to each other. Reference will also be made to Figs. 15 and 17 which show the positions of the parts when the cam shaft has rotated approximately 45° from the position of Figs. 25 through 28 and the turret shaft has rotated approximately 15° from the position of Fig. 10.

When the cam shaft 259 and turrent shaft 52 are in the position of Figs. 10 and 25 through 28, the clamping head 301 and plunger elevator 326 lie in the position of Fig. 19. At this time a turret lobe slot is about to move into position about the edge of the cut disc.

During the first 45° of rotation of the cam shaft the parts come to the position shown in Figs. 17 and 19. At this time a cap has been cut from the strip of material and elevated to position to be seized by the turret fingers, the turret lobe slot has the edge of the disc within it, the turret has decelerated and is stopped, and the disc is held in position by means of the weight 308 which holds the disc against the plunger elevator.

As the shafts continue to rotate the turret remains stopped while the cam roller 302 is caused to rise under control of the cam groove 303 and lift the clamping head 301, thus lifting the weight 308 from the disc. Immediately prior to the instant that the weight is lifted from the disc the cam plate 337 is lifted from the path of the roller 336 and spring 334 causes rotation of the block 333 causing fingers 335 to pass through slots in the upper edge of the lobe of turret 330 to grip the disc.

The cam roller 154 (Fig. 10) having now passed beyond the lobe of cam 153, the turret plate 330 accelerates and carries the cut disc or blank away from the cutting position. Fig. 21 shows the position of the parts when the disc has been moved slightly from the cutting position.

When the blank has been completely removed from the cutting position, cams 329 and 261 will have rotated sufficiently to present descending curves of their grooves to rollers 302 and 328. Thus the elevator 326 and head 301 will descend and take the position of Fig. 22. (The material will not yet have been fed; therefore, Fig. 22 does not represent the position of the material at this time.)

While the head 301 and plunger 308 are descending, cam roller 262 is encountering the ascending curve of surface 371 and immediately after the head and plunger have descended the feeding rack is raised into engagement with the feeding gears. When the rack has meshed with the gears, cam 297 will have rotated to position where roller 296 is caused to move inwardly, thus causing a forward stroke of the feeding rack. The condition at the end of this forward stroke is shown in Fig. 22.

Immediately upon completion of the forward stroke of the rack the cam 261 presents a descending curve to roller 262, thus causing the rack to move downwardly out of engagement with the feed roller gears. Immediately after this the outward slope of cam 297 is presented to the cam roller 296 and the return movement of the rack commences.

During the return stroke of the rack cam groove 303 moves into a position in which a downward slope thereof is presented to roller 302. The head 301 is thus caused to move downward from the position of Fig. 22 to a position in which the weight 308 rests upon the material. At the moment when this occurs cam 329 will have rotated to position to present a downward slope to roller 328 and, since roller 302 is still on a downward slope, the elevator 326 and head 301 descend together, thus bringing the parts to the position of Fig. 23, in which the material is clamped between the two clamping rings and released from tension of the feed and idler rollers, the plunger 308 rests on the material, and the knives have penetrated the material and are rotating (the knives are constantly rotating as described) to cut a disc therefrom.

Shortly after this the elevator cam 329 reaches a position in which an upward slope thereof lies under the roller and the elevator is caused to rise. At the same instant the clamping head cam reaches a position in which an upward slope thereof is presented to cam roller 302. Consequently, the elevator or plunger 326 and the clamping head 301 rise together, but since the clamping head moves a lesser distance the cut disc is held between the weight 308 and the plunger 326. The feed and idler rollers remain apart (due to mechanism described above).

At this time the cycle is complete, the cams again occupying the positions of Figs. 10, and 25 through 28, and the clamping head and elevator being in the position of Fig. 19.

Shortly thereafter the newly cut disc will be gripped by the turret fingers and moved away from the cutting head, initiating a new cycle identical with that described above.

*Static eliminating means*

Cellulose acetate and similar material appears to become charged with static electricity either during the manufacturing thereof or during cutting of the wide sheets to form the narrow strips used in either of the machines described above.

A number of devices for lessening the detrimental effects of static electricity are shown in the drawings; while some of these devices are shown in connection with the first and others in connection with the second described machine it is to be understood that this is merely for convenience in illustration and that, generally speaking, these devices may be used in any combination on either machine.

One system of lessening the effect of static which has been found quite successful is to mount over the strip of material a number of needles 400 (Figs. 15 and 16) spaced from the material and at a relatively high electrical potential.

Needles 400 are fastened to fine coil springs 401 which depend from a horizontal bar 402 insulatedly supported from casting 240 in any suitable manner. High potential electricity is supplied to the bar 402 by the secondary of a transformer (not shown), the primary of which is connected across the power mains.

Another means for preventing detrimental effects of static is shown in Figs. 4 and 5 in which the scrap roller 102 is merely the driving roller for a canvas conveyor belt 190 which passes over roller 102 and over an idler roller (not shown) rotatably supported in brackets fixed to the lower portion of casting 40. The scrap material is pulled from the feed rollers by means of this belt.

Whether due to slippage of the material relative to the belt (because of the speed difference between the feed and scrap rollers) or to some other reason, the scrap material, which adheres to belt 190 at the top thereof, stands out from the belt at the bottom thereof and is entirely free from the machine and drops readily into a waste receptacle. It may be that friction between the belt and material causes the two to be charged with electricity of the same polarity and results in repulsion of the material by the belt.

The water box previously described, shown in Figs. 15 and 16, also serves to reduce the effects of static, the wet material being much less attracted to the metal parts of the machine than is the case when the scrap feed roller is allowed to become dry.

The bars 338 of Figs. 15 and 24 may also be considered a means for overcoming the detrimental effects of static. Prior to using these bars, there was provided a plate to guide and support the cut discs. Discs were frequently so highly charged that the attraction to the plate removed them from the turret fingers.

The construction of the turret head of the first described embodiment of the invention also prevents any detrimental effects of static for this construction makes the tendency of charged discs to adhere to metallic parts of the machine advantageous since the action of clamping rings 151 is thus augmented.

While preferred embodiments of the invention have been described, it is to be understood that no limitation is to be implied thereby and that the scope of the invention is to be limited only by the appended claims.

What I claim and desire to secure by United States Letters Patent is:

1. In a machine of the class described, means for intermittently feeding material to a cutting head, means for clamping said material in position to be cut, and means for releasing the material from tension applied by said feeding means while clamped in said clamping means.

2. In a machine of the class described, in combination, means for intermittently feeding material to position to be cut, means movable into contact with said material to clamp a portion on which a cutting operation is to be performed, and means operated by said movable means to release the tension applied to said material by said feeding means.

3. In a machine of the class described, means for intermittently advancing a strip of material to position successive portions for operation thereupon, said advancing means comprising feed rollers and idler rollers spring pressed toward each other and against the material, means movable into position to clamp said portions during operation thereupon, and means carried by said movable means to move said idler rollers from said feed rollers while any portion is clamped in position to be operated upon.

4. In a machine of the class described, a rotatable turret device for conveying blanks from preparing to applying position comprising a turret plate, compartments in said plate for receiving blanks, and means for rotating said turret plate at varying speed including momentary zero speed intervals, said last mentioned means including a drive shaft rotating at constant speed.

5. A turret head for conveying blanks from preparing to applying position comprising a turret plate having means to receive and hold said blanks, a drive shaft rotatable at constant speed on which said plate is rotatably mounted, a stationary cam through which said shaft passes, and an arm fixed on said shaft and having means oscillatable in an extremity thereof to cooperate with said cam and said turret plate to cause said turret plate to rotate under drive of said shaft but to be advanced or retarded with respect thereto in accordance with the contour of said cam.

6. In a machine of the class described, material feeding means intermittently operable to advance portions of material successively, rotatable means for cutting discs from successive portions of said material, a rotatable conveyor means for conveying discs away from said cutting means, means to cause said conveyor means to rotate at varying speed including momentary zero speed intervals, means for driving said cutting means from said conveying means, and means for removing discs from said cutting means and depositing them in said conveyor means during said zero speed intervals.

7. In a machine for preparing and feeding closures for containers, a closure feeding means comprising a turret plate having marginal extensions with slotted edges, a pivoted block adjacent each extension, fingers fixed to each said block adapted to pass through elongated holes in the adjacent extension and lie against the far wall of the edge slot, and means on said blocks for cooperating with cam means to raise said fingers and permit prepared closures to enter said slots and to lower said fingers to hold the closures in said slots for feeding said closures.

8. In a machine for preparing and feeding closures for containers, a closure feeding means comprising a turret plate having marginal holes which on one surface are smaller than the closures to be placed therein and on the other surface are larger than the closures to be placed therein, the said surfaces being joined by a bevel and a clamping ring held against the surface having the smaller diameter marginal hole whereby a closure entering said plate has its margins bent and then snapped beneath said lower surface of said plate and between said plate and said clamping ring.

9. In a machine of the class described, in combination, means for cutting discs from a strip of material, means for intermittently feeding said strip of material to present successive portions thereof to said cutting means, means to clamp a presented portion in position for cutting, means for releasing said feeding means from said material upon operation of said clamping means, means for rotating said cutting means, and means to move said rotating cutting means into contact with the clamped portion of material to cut a disc therefrom.

10. In a machine of the class described, in combination, intermittently operating means for feeding material to position to be operated upon, means for clamping portions of material successively in such position, rotary cutting means, means for advancing said clamping means and portion of material against said cutting means, holding means released by said clamping means, means cooperating with said holding means upon release to hold the material cut by said cutting means, and means to move said last mentioned means with said holding means to carry said cut material from the remainder of the material portion.

11. In a machine of the class described, intermittently operable means for feeding material to position to be operated upon, means to clamp successive portions in position, a rotary cutter, means to lower said clamping means to carry a clamped portion of the material against said rotary cutter, means within said clamping means operated by gravity to lie on said material portion within said rotary cutter, an elevator plunger within said rotary cutter beneath said gravity operated means, and means to raise said elevator plunger to cause a disc cut from said material by said cutter to be raised from the remainder of said material portion while held between said elevator and said gravity operated means.

HENRY F. GLUNZ.